Dec. 13, 1932.                H. HEINZELMANN                1,890,813
FOUR-STROKE INTERNAL COMBUSTION ENGINE
Filed July 16, 1929
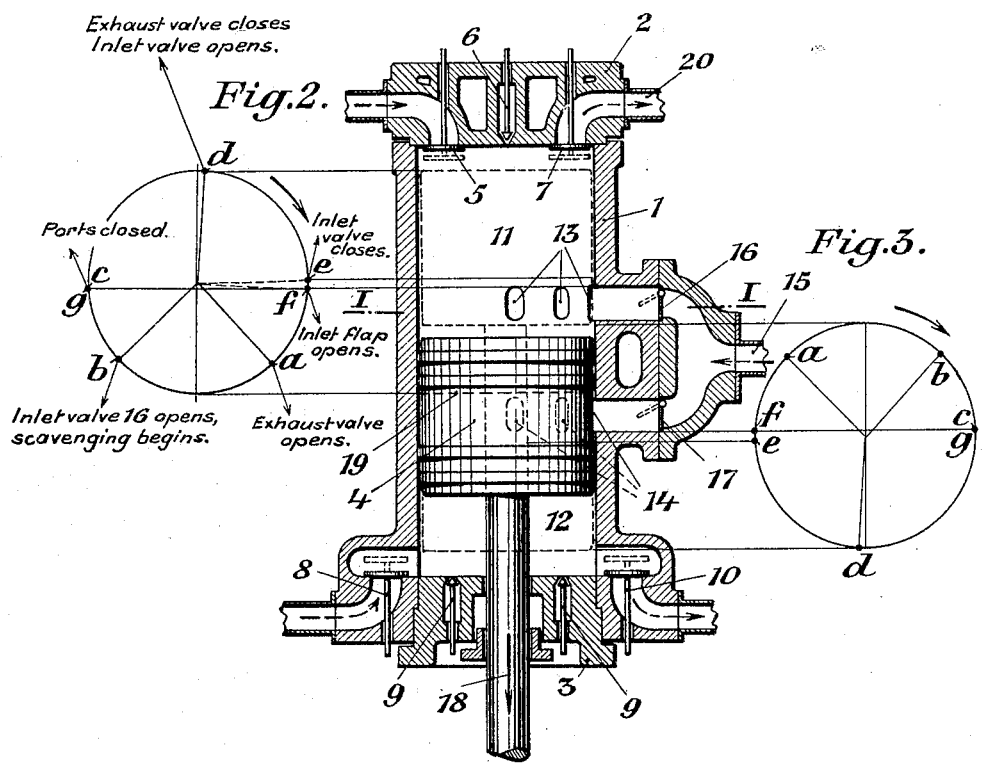
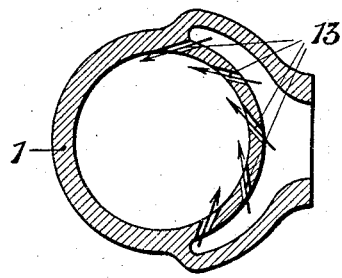
INVENTOR:
Hans Heinzelmann
BY
Pennie Davis Marvin + Edmonds
ATTORNEY.

Patented Dec. 13, 1932

1,890,813

UNITED STATES PATENT OFFICE

HANS HEINZELMANN, OF KUSNACHT, SWITZERLAND

FOUR-STROKE INTERNAL COMBUSTION ENGINE

Application filed July 16, 1929, Serial No. 378,639, and in Switzerland March 4, 1929.

This invention relates to four-stroke internal combustion engines and has for its object to provide an improved four-stroke internal combustion engine of the kind having inlet and exhaust valves situated at the end of the cylinder and in addition air inlet ports formed in the cylinder wall where they will be uncovered by the piston.

According to the present invention scavenging air is introduced through the ports in the cylinder wall and, after the exhaust valve has closed, air is admitted firstly during the earlier stages of the induction stroke, through the inlet valve at the end of the cylinder, and subsequently, during the later stages of the induction stroke, and preferably before the ports in the cylinder wall are uncovered, the inlet valve at the end of the cylinder is closed so that the continued movement of the piston creates a depression in the cylinder whereby the air is caused to flow through the ports in the cylinder wall at high velocity and thus to penetrate and cause turbulence of the air charge already within the cylinder.

The ports uncovered by the piston preferably pass substantially tangentially through the cylinder wall so that the air entering therethrough tends to rotate about the cylinder axis.

A construction of double-acting internal combustion engine according to the present invention is illustrated by way of example in the accompanying drawing, in which Figure 1 is a section through the cylinder, Figure 2 is a crank diagram for the cycle of operations in the upper end of the cylinder, Figure 3 is a crank diagram for the cycle of operations in the lower end of the cylinder, and Figure 4 is a section in the plane I—I of Figure 1.

In the construction illustrated, the cylinder 1, which is closed at its upper end by a cylinder head 2 and at its lower end by a cover plate 3, has a piston 4 reciprocating within it. Carried by the cylinder head 2 are an inlet valve 5, a fuel injection valve 6, and an exhaust valve 7, the lower end of the cylinder and the cover plate 3 similarly carrying an inlet valve 8, fuel injection valves 9, and an exhaust valve 10. The upper working chamber 11 and the lower working chamber 12 are connected respectively through ports 13 and 14 to an air inlet pipe 15, the communicating passages between the ports 13 and 14 and the pipe 15 being capable of being controlled by valves 16, 17.

The working of the engine will now be described with reference to the cycle of operations taking place in the upper working chamber 11 and to the crank diagram shown in Figure 2.

Assume that the piston 4 occupies the position indicated in Figure 1 and is moving in the direction of the arrow 18. Both the inlet valve 5 and the exhaust valve 7 are now closed, the flap valve 16 being also closed owing to the pressure in the working chamber 11 exceeding the air pressure in the pipe 15. A short while before the piston reaches its lower dead centre position, indicated by the dotted line 19, e. g. at the point $a$ on the crank diagram shown in Figure 2, the exhaust valve 7 is opened, as indicated in dotted lines in Figure 1, so that the burnt gases can pass into the exhaust pipe 20. When the pressure in the working chamber 11 has dropped to a pressure less than the pressure in the pipe 15, e. g. when the piston has reached the position corresponding to the crank position $b$ indicated in Figure 2, the valve 16 will be opened by the pressure of air in the pipe 15 and air will pass through the ports 13 into the working chamber 11, this flow of air into the cylinder continuing until the piston 4 again closes the ports 13, i. e. when it reaches the position corresponding to the crank position $c$ indicated in Figure 2. The air in pipe 15 is supplied from a source of air under pressure. The air pressure in the pipe 15 that is imposed upon the valve 16 is of such value relative to the internal pressure of the cylinder 11 that when the piston 4 is moved over the air inlet ports 13 on the exhaust stroke that the valve 16 will swing open and air will rush into the cylinder. Likewise, on the suction stroke the air pressure in pipe 15 exceeds the pressure within the cylinder 11 and air is forced into the cylinder, thru the air inlet ports 13. When the piston reaches a point adjacent to its upper dead centre, e. g. the position corresponding to the crank position *d* (Figure 2), the exhaust valve 7 is closed and the inlet valve 5 is opened. Air will now enter the cylinder through the valve 5 until the piston reaches the point corresponding to the crank position *e* (Figure 2) when this valve will be closed. Thus, the inlet valve 5 is closed before the piston uncovers the ports 13 during the suction stroke so that at the moment when the ports 13 are uncovered, i. e. when the piston occupies the position corresponding to the crank position *f* (Figure 2), there will be a depression in the working chamber 11 relatively to the pressure in the pipe 15. As a result of this depression the admission of air through the pipe 15 will be accelerated when the ports 13 are uncovered, and since these ports open tangentially into the cylinder the air entering therethrough will impart to the air already within the cylinder a rotary motion about the cylinder axis. This rotary motion will be transmitted to the whole contents of the cylinder and will be maintained even after the ports 13 have been again closed by the return movement of the piston 4, i. e. after the piston has passed the position corresponding to the crank position *g* (Figure 2). The air charge is then compressed and fuel is injected whereupon the expansion of the gases after ignition of the fuel forces the piston 4 downwards in the direction of the arrow 18, and the cycle of operations described above is repeated.

A similar cycle of operations to that described above with reference to the working chamber 11 takes place in the working chamber 12 as indicated by the crank diagram shown in Figure 3, the working stroke in the working chamber 11 taking place simultaneously with the compression stroke in the working chamber 12.

It is to be understood that a double-acting internal combustion engine such as that illustrated may be constructed in such a manner that the working stroke in the working chamber 11 takes place simultaneously with the exhaust stroke in the working chamber 12. Further, the arrangement or the number of valves employed may be varied as well as the number of ports 13, 14 and their distances from the dead centre position of the piston.

Again, it is to be understood that although the invention has been described with particular reference to a double-acting internal combustion engine, it may be applied equally to a single-acting engine.

I claim:

1. In a four-stroke internal combustion engine, a cylinder having inlet and exhaust valves disposed in the end thereof and a plurality of air inlet ports arranged in the wall thereof, a piston in said cylinder, said air inlet ports being so arranged as to be covered by said piston during its travel in said cylinder and to be uncovered by said piston during its travel in said cylinder after the inlet valve has closed during the suction stroke, means for supplying air under pressure to said air inlet ports, and means responsive to a difference in pressure between said cylinder and said air supply for controlling the supply of air to said cylinder, whereby during the exhaust stroke air is introduced into said cylinder from said air inlet ports and during the suction stroke air is introduced into said cylinder first from said inlet valve and subsequently from said air inlet ports.

2. In a four-stroke internal combustion engine, a cylinder having an air inlet valve, a fuel inlet valve and an exhaust valve disposed in the end thereof and a plurality of air inlet ports arranged in the wall thereof, a piston in said cylinder, said air inlet ports being so arranged as to be covered and uncovered by said piston during its travel in said cylinder, and means for controlling the supply of air to said air inlet ports in accordance with the pressure in said cylinder.

3. Apparatus according to claim 2 wherein the air inlet ports are so arranged with respect to the travel of the piston that they are not uncovered until after the air inlet valve has closed during the suction stroke.

4. The improvement in the process of operating a four-cycle Diesel engine having at the cover end an outlet device and having at both ends of the operating space means for supplying scavenging and loading air, comprising after opening the outlet in the vicinity of the inner dead center, scavenging through a point near the inner dead center, and after the closing of the outlet port at the outer dead center at the time of the subsequent inward stroke, admitting loading air first through an inlet on the outer end of the operating space, subsequently in the course of the inward stroke closing this inlet port prematurely, and creating a vacuum in the operating cylinder by the advance of the piston equal to a partial stroke distance, and during the further stroke of the piston opening again the inlet port situated near the inner dead center, whereby owing to the vacuum in the cylinder, accelerated penetration of the air flowing into the operating space is attained which effects by its speed a whirling movement of the amount of air previously sucked in.

In testimony whereof I have affixed my signature.

HANS HEINZELMANN.